Aug. 17, 1965   J. A. PETERSON ETAL   3,200,966
RAPID TRANSVERSE UNLOADING MECHANISM
Filed Dec. 11, 1962                          6 Sheets-Sheet 1

FIG.1

INVENTORS
Jack A. Peterson
BY Joseph L. Deibel

ATTORNEYS

Aug. 17, 1965  J. A. PETERSON ETAL  3,200,966
RAPID TRANSVERSE UNLOADING MECHANISM
Filed Dec. 11, 1962  6 Sheets-Sheet 4

INVENTORS
Jack A. Peterson
BY Joseph L. Deibel
ATTORNEYS

United States Patent Office 3,200,966
Patented Aug. 17, 1965

3,200,966
RAPID TRANSVERSE UNLOADING MECHANISM
Jack A. Peterson, Downers Grove, and Joseph L. Deibel, Palatine, Ill., assignors, by mesne assignments, to Magnaflux Corporation, Chicago, Ill., a corporation of Delaware
Filed Dec. 11, 1962, Ser. No. 243,798
6 Claims. (Cl. 214—1)

The present invention relates to apparatus for the handling and inspection of elongated articles referred to herein as billets and more particularly to apparatus which permits the handling and inspection of such articles in a very rapid and highly efficient manner while being comparatively simple in construction, compact, rugged and reliable.

The apparatus of this invention was particularly designed for inspecting articles by the magnetic particle method wherein flaws and imperfections in elongated articles are detected by observing the formation of magnetic particles applied to the surface of the article during or after magnetization thereof.

The invention is particularly advantageous when used with the magnetic particle method but is not necessarily limited thereto and may be applied to any apparatus for delivering articles to a magnetizing or processing station, thence to an inspection station where it is rotated during inspection and thereafter removed from the inspection station and conveyed from the structure.

In one known type of apparatus for handling and inspecting billets, billets are transferred by swingable arm means through a magnetizing station to an inspection station. The billets are then rotated on a wheel to permit inspection of the various surfaces of the billet. This apparatus is quite satisfactory in many respects but has the disadvantage of providing only two positions of the billet during inspection. After the billet leaves the second inspection position it cannot be rotated to its first position for a reinspection without removing the billet from the entire apparatus and feeding it once again into the apparatus and through all its transfer stages until it reaches the first inspection position.

In another known type of apparatus for handling and inspecting billets, billets are transferred by swingable arm means through a magnetizing station to an inspection station where chain sling turners are provided to permit repeated rotation of the billet as required for proper inspection. After the billet is inspected, however, it is lowered to a roller conveyor system located below the chain sling turners for conveying the billet longitudinally from the inspection station. This apparatus thus has the disadvantage of requiring the entire inspected billet to be conveyed longitudinally from the inspection station before another billet can be transferred into the inspection station.

The present invention relates to an apparatus providing not only a lateral feed of a billet through the various stations of the apparatus as well as repeated rotation of the billet in the inspection station, but also provides for lateral transfer of the billet from the inspection station upon completion of the inspection. Therefore, the time required to clear the inspection station of the billet and feed another billet into the inspection station is materially reduced.

Since the articles handled in this type apparatus are often extremely heavy it has been found beneficial to provide a means to impede the impact of the articles striking certain members of the apparatus as it is being transferred through the apparatus. Therefore, another feature of the present invention comprises a means for gently easing down a billet not only onto the chain sling turner but also onto the roller conveyor system.

Another feature of the present invention provides that the lateral transfer of an inspected billet from the inspection station is made in the direction of the magnetizing station, that is, in the direction from which the billet is fed to the inspection station. Not only does this provide minimal overall width of the entire apparatus, but also permits an inspector's platform to be located directly adjacent the inspection station, since billets being transferred into and out of the inspection station are always located on the side of the inspection station opposite the inspector's platform.

In view of the above comparison of the present invention with earlier inventions it is clear that a principal object of the present invention is to provide an efficient, compact apparatus for handling and inspecting billets and the like wherein billets are transferred laterally from one side of an inspection station to the inspection station, the billets thereafter being rotated and inspected at the inspection station and thence transferred laterally from the inspection station to the said one side of the inspection station.

Another object of the invention is to provide a more efficient apparatus for removal of an inspected billet from the inspection station.

Another object of the invention is to provide a means to more gently handle billets in an inspection apparatus and thereby to avoid great impact of the billet as it strikes certain members of the apparatus.

Yet another object of the invention is to provide an inspection apparatus wherein lateral transfer of billets into and out of the inspection station is accomplished without interference with an inspector's platform located directly adjacent the inspection station.

Many other features, advantages and additional objects will become manifest to those versed in the art from the following detailed description of the invention taken in conjunction with the accompanying drawings which illustrate a preferred embodiment and in which.

Figure 1:
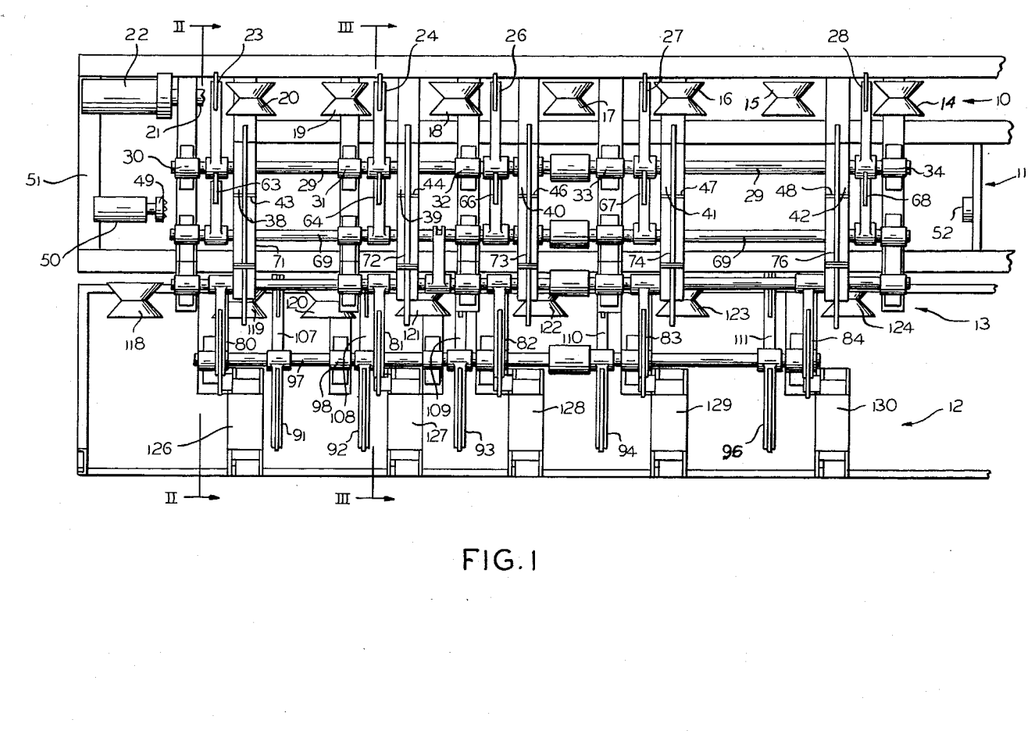
FIGURE 1 is a top plan view of a billet handling and inspection apparatus constructed in accordance with the principles of the present invention.
Figure 2:
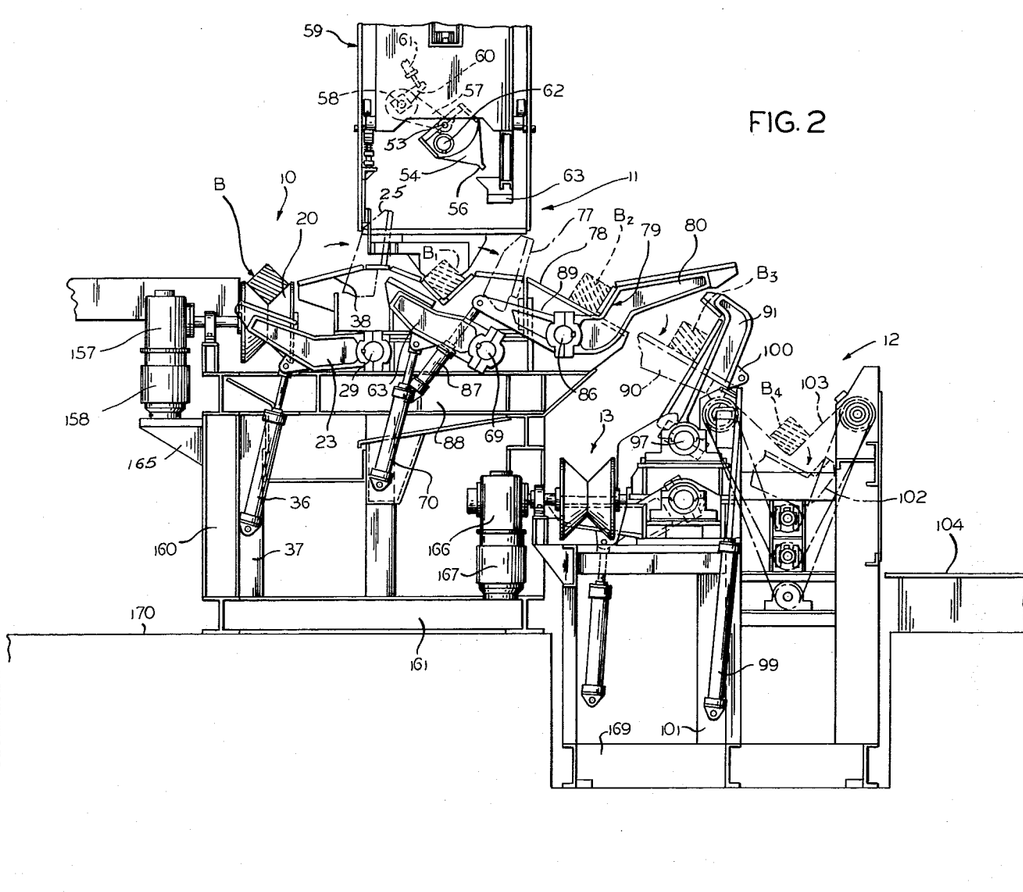
FIGURE 2 is an enlarged vertical sectional view taken substantially along line II—II of FIGURE 1 and showing swingable arm members in certain positions of operation.

Having reference to FIGURES 1 and 2, an installation of apparatus embodying the present invention is depicted of a type adapted to handle and process for inspection large, rectangularly shaped billets, and it will be readily apparent that by appropriately sizing, selecting and constructing the apparatus there is no apparent limit upon the range of practical or commercial sizes for which the apparatus may be adapted. Although the apparatus is disclosed as especially adapted for handling billets of rectangular cross-section, it is usable with equal facility with round billets and billets of other cross-sections. The term "Billet" is used herein in a generic sense to include various elongated objects or articles, which may be of polygonal or other cross-sections and which may be solid or tubular, pipes, bars, rods and the like being included.

A billet B to be inspected is delivered from a loading station 10 to a tail stock and magnetizing and bath applicator station 11 where the billet is magnetized to provide a substantially uniform magnetic flux over its entire surface except as distorted by defects within the billet, whereupon magnetic particles from a bath containing such particles deposited on the billet are attracted to the regions of distortion of the magnetic field and thereby indicate the presence of defects. Thereafter the billet with the magnetically oriented particles thereon is transferred to an inspection station 12 where a person skilled in this art visually inspects the treated billet and applies thereto markings to identify the nature and location of detected flaws or imperfections, and any other identification, advisory, code and the like markings that may be desired. After inspection has been completed the inspected billet is transferred from the inspection station 12 to an unloading assembly 13.

*General arrangement*

In the operation of the apparatus a billet B is moved longitudinally on rollers 14–20 in the direction of roller 20 until the end of the billet engages a snubber element 21 which is in abutting engagement with springs (not shown) encased in a support 22. When in this position, the billet overlies a series of swingable loading arms 23, 24, 26, 27 and 28. The swingable arms are keyed to a horizontal rotatable shaft 29 which is journalled by bearings 30, 31, 32, 33 and 34. A fluid operated cylinder 36 is connected to the shaft 29 by means of the swingable loading arm 23 and is pivotally connected at its lower extremity to a vertical upright 37.

Upon admission of pressurized fluid to the cylinder 36, the shaft 29 is rotated in a clockwise direction, as viewed in FIGURE 2, to engage the underside of the billet B and then lift and slide the billet over skid rails 38, 39, 40, 41 and 42 until gravity drops the billet into notches 43, 44, 46, 47 and 48.

The billet, disposed in notches 43–48, is designated $B_1$ in FIGURE 2. The forward end of billet $B_1$ (the left-hand end as viewed in FIGURE 1) is disposed adjacent an electric contact element 49 carried by a fluid operated cylinder 50 which is securely fastened to a horizontal member 51. The rearward end of billet $B_1$ is disposed adjacent a second electrical contact element 52 which is slidably carried by a traveling tailstock carriage 59. The carriage 59 is rollably carried on a beam (not shown) and its traveling capability effectively permits accommodation of billets of various lengths in the apparatus. Upon admission of pressurized fluid to the cylinder 50, the electrical contact element 49 is moved outwardly in the direction of billet $B_1$ and the forward and rearward ends of the billet are thereby brought into abutting engagement with the electrical contact elements 49 and 52.

An electric power source is thereafter connected to the contacts 49 and 52, thereby causing current to flow through the billet $B_1$. In response to such current flow, a substantially uniform magnetic flux will be developed over the entire surface of the billet except as distorted by defects within the billet.

During such magnetization of the billet, magnetic particles may be distributed over the surface of the billets, to be attracted to regions of distortion of the magnetic field and thereby indicate the presence of defects. With the billets being of a magnetic material, such as steel, it is also possible to apply the particles after the magnetizing step, since there will be a remanent magnetization of the billets.

The magnetic particles are preferably carried in a suitable fluid which is applied over the billet by means of a bath applicator system. As illustrated in FIGURE 2, a V-shaped applicator 54 is mounted on a shaft 53 and has an apertured lower extremity 56. A chain 57 is trained over the shaft 53 and a shaft 58. The shaft 58 is rotated by a cylinder 61 connected to the shaft 58 by an arm 60. The bath applicator fluid which contains magnetic particles is fed by valve means (not shown) through conduit 62 into the applicator 54. Upon admission of pressurized fluid to the cylinder 61, the shaft 58 will rotate in a clockwise direction and the applicator fluid will drain from the aperture extremity 56 to completely flood the billet $B_1$. The operation of cylinder 61 is arranged to swing the applicator 54 back and forth over the billet for a pre-determined interval of time after which the cylinder 61 will cause the applicator to rotate in a counterclockwise direction until the lower extremity thereof is positioned substantially above the trough 63.

After the billet $B_1$ has been magnetized and flooded with the magnetic particle solution, the operation of the cylinder 50 is arranged to disengage the electrical contact element 49 from the billet, and the carriage 59 is backed off from the billet, thereby disengaging contact 52 therefrom.

With the billet disposed in this position, it overlies a series of swingable unloading arms 63, 64, 66, 67 and 68 which are keyed to a horizontal rotatable shaft 69 actuated by a cylinder 70 through the unloading arm 63. Upon admission of pressurized fluid to the cylinder 70 the shaft 69 will rotate in a clockwise direction and the swingable unloading arms 63, 64, 66, 67 and 68 will be rotated into engagement with the lower side of the billet $B_1$ and slide the billet upwardly and forwardly over skid rails 71, 72, 73, 74 and 76. When the swingable arm 63 reaches its extreme rotatable position as shown by dashed lines at reference numeral 77, the billet will proceed along the downwardly inclined portion of the skid rails as shown at 78 until it is received in abutting engagement by offsets 79 of swingable feed arms 80, 81, 82, 83 and 84. The feed arms are keyed to a horizontal rotatable shaft 86 which is actuated by cylinder 87, which is pivotally connected at its lower extremity to a flange support 88 through a feed linking arm 89. In this position, the billet is designated as $B_2$ as shown in FIGURE 2. The admission of pressurized fluid to cylinder 87 will give clockwise rotation to the shaft 86 and cause the swingable feed arms 80–84 to rotate to a position as shown in dashed lines at reference numeral 90 in FIGURE 2. The billet $B_2$ will move downwardly along the feed arms as they approach their extreme rotatable position 90 until it is received in abutting engagement by rapid discharge arms 91, 92, 93, 94 and 96 which are keyed to a horizontal rotatable shaft 97. The shaft 97 is journalled by bearings as exemplified at 98 and is connected to a cylinder 99 through a linking flange 100 of the discharge arm 91. The lower extremity of the cylinder 99 is pivotally connected to a vertical upright 101. In this position the billet is designated as $B_3$ as shown in FIGURE 2.

An admission of pressurized fluid to the cylinder 99 will cause the discharge arms 91–96 to rotate slowly in a clockwise direction until the discharge arms are disposed as indicated by dashed lines 102. As the discharge arms are being rotated to their extreme rotatable position as shown at 102 the billet $B_3$ will move downwardly and forwardly along the upper surface of the discharge arms until it is received in abutting engagement by chain slings 103 of the inspection station 12. In this position, the billet is designated as $B_4$.

Billet $B_4$ is thereafter rotated slowly on the chain slings of the inspection station, which will be described in detail hereinafter, and an inspector who is skilled in the art can inspect the rotating billet by standing on an inspector's platform 104. After the billet $B_4$ is marked, coded or the like, it is then discharged on transferred from the inspection station 12.

It is clear that the billet $B_4$, when being fed to the inspection station, is gently lowered and eased down by the discharge arms onto the chain slings 103 thereby preventing a great shock and impact from being applied to the chain slings.

Figure 3:
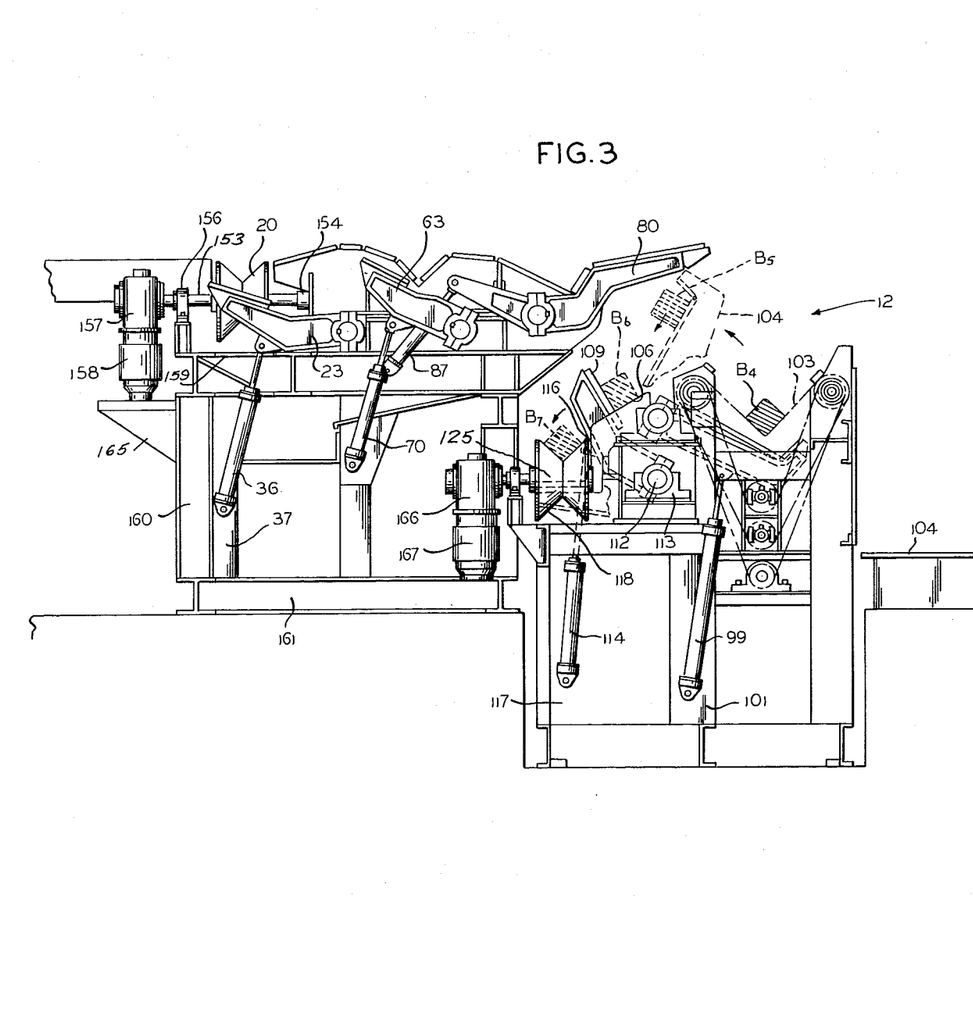
FIGURE 3 is an enlarged fragmentary vertical sectional view taken substantially along line III—III of FIGURE 1 and illustrates swingable arm members in additional positions of operation.

The subsequent steps involved in the operation of the apparatus are best illustrated in FIGURE 3. Admission of air pressure to the cylinder 99 will cause counterclockwise rotation of discharge arms 91, 92, 93, 94 and 96 from the position 102 underlying the billet $B_4$. As the discharge arms begin to rotate above the chain sling 103 to their extreme rotatable position as indicated by the dashed lines 104, the billet now designated as $B_5$ in FIGURE 3, slides downwardly along the discharge arms until it is received in abutting engagement by skid rails as exemplified at 106 and swingable receiving arms 107, 108, 109, 110 and 111. In this position, the billet is designated as $B_6$ in FIGURE 3. The receiving arms 107–111 are keyed to a horizontal rotatable shaft 112 which is journalled in bearings as exemplified at 113 and actuated by a cylinder 114 through a linking flange 116 of a receiving arm 109. The lower extremity of cylinder 114 is pivotally connected to a vertical upright 117. An admission of pressurized fluid to cylinder 114 will cause counterclockwise rotation of the shaft 112 and the receiving arms 107–111. As the receiving arms rotate the billet $B_6$ will move downwardly along the upper surface of the skid rail 106 until it engages in abutting relation the notched surfaces of rollers 118–124. The receiving arms will continue to rotate to their extreme rotatable position as illustrated by dashed lines at reference numeral 125, and since the receiving arms are adapted to rotate slowly it is clear that the billet is received by the rollers without great force or impact. In this position, the billet is designated as $B_7$ in FIGURE 3.

The billet $B_7$ may be conveyed longitudinally from the apparatus by means of the conveyor rollers 118–124, and it is thus clear that the entire operation including the feeding of an uninspected billet laterally to the inspection station, and thereafter the discharging of the inspected billet laterally in the same direction from which it was fed, provides for rapid unloading of the inspection station. Moreover, the lateral or transverse loading and unloading operation is accomplished without interference to the inspector's platform.

Figure 4:
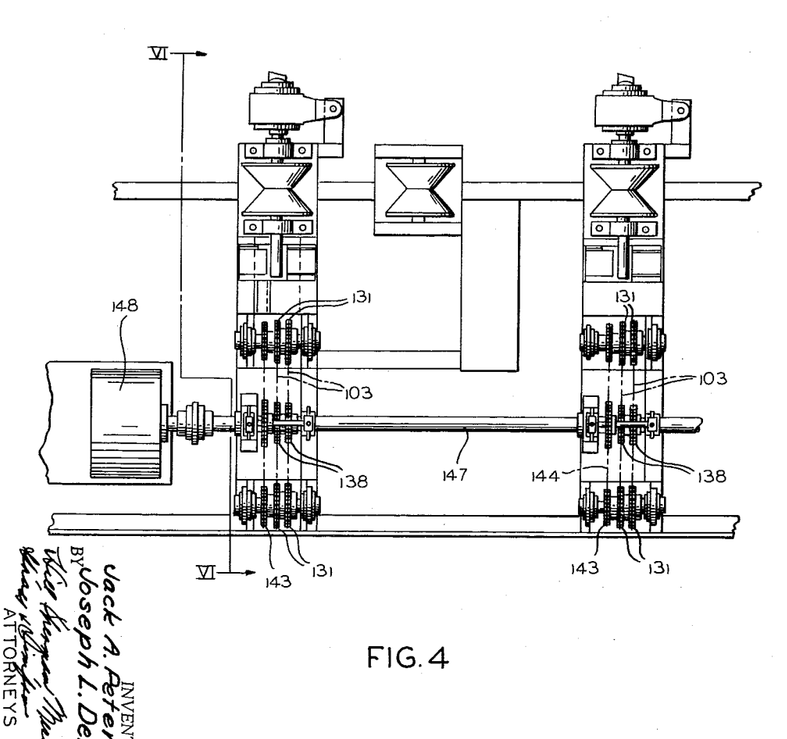
FIGURE 4 is a top plan view of a portion of the inspection station of the apparatus.
Figure 5:
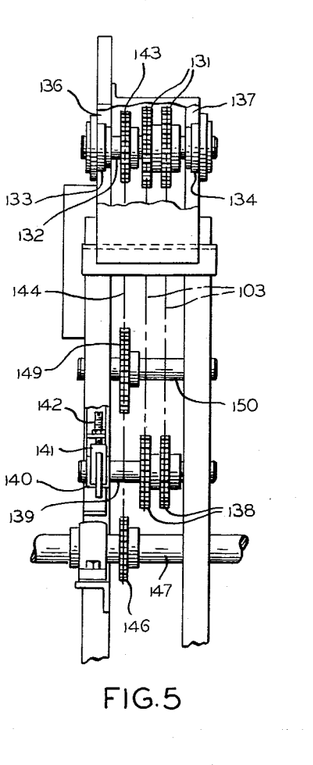
FIGURE 5 is a side elevational view of a part of the inspection station apparatus shown in FIGURE 4.

As illustrated in FIGURE 1, the inspection station 12 comprises a series of chain sling turner stations 126, 127, 128, 129, and 130. Referring to FIGURES 3, 4 and 5, each chain sling turner station has a pair of chain slings 103, each of which is trained over a pair of sprockets 131 at the upper portion of the turner station to form a sag or catenary at the center line of the turner station. When the billet $B_4$ is fed into the inspection station it is carried and rotated by the chain slings. The sprockets 131 are keyed to a horizontal shaft 132 which is journalled in bearings 133 and 134 which are supported by vertical uprights 136 and 137. In order to provide for endless rotation of the chain slings 103 over the sprockets 131 and to further provide for an optimum sag or catenary for a variety of sizes of billets, the lower portion of the chain slings 103 are trained around a double sprocket idler wheel or gear 138. The idler wheel is keyed to a shaft 139 which is carried by bearings exemplified as at 140 which are journalled as at 141. Journals 141 are vertically adjustable by means of a locking mechanism 142.

A driven sprocket 143 is mounted on and keyed to each of the shafts 132 and is driven by means of a driving chain 144. The chain 144 is driven by means of a driving sprocket 146 which is connected by means of a horizontal shaft 147 to a rotatable driving means such as an electric motor 148. To provide for endless rotation of the driving chain 144 over the driven sprockets 143, the chain 144 is trained around the lower portion of an idler sprocket or gear 149 which is keyed to a shaft 150. The shaft 150 is carried by a journal means 151 and a vertically adjustable locking mechanism 152 similar to 141 and 142 which carry shaft 139.

To impart drive to the conveyor rollers 14–20 and 118–124, each roller is preferably individually motorized.

Figure 6:
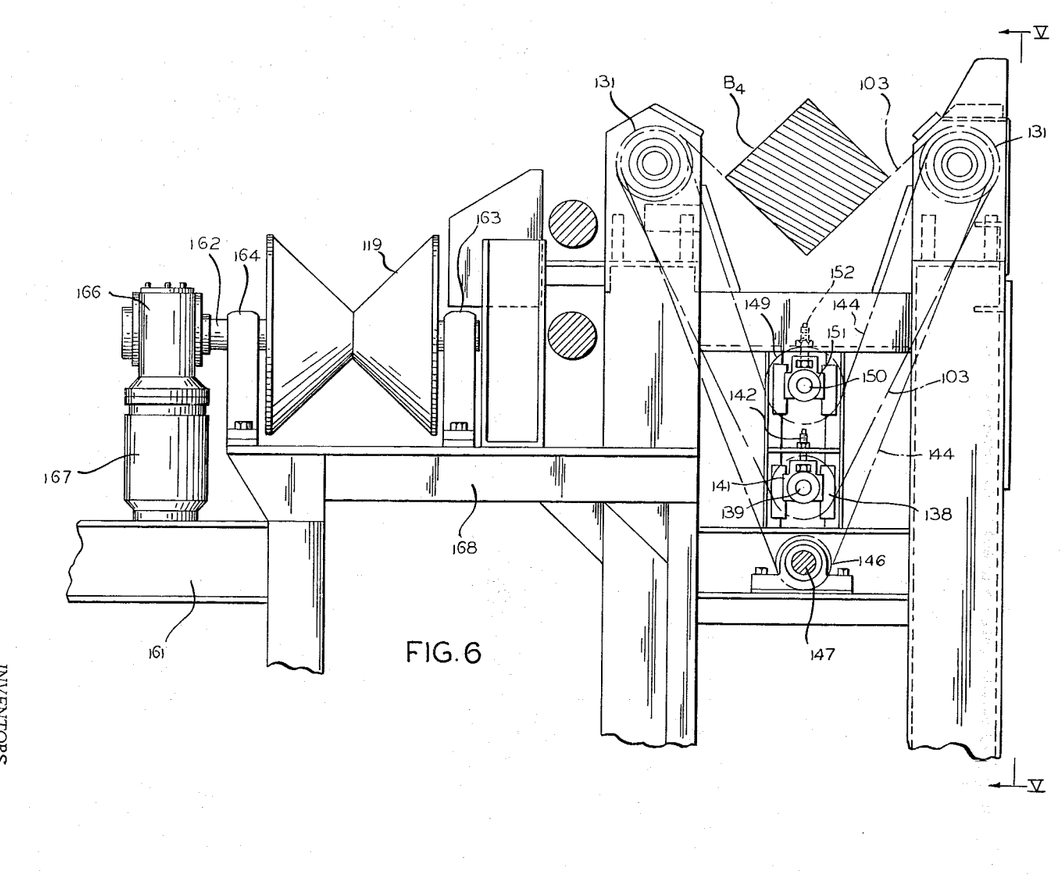
FIGURE 6 is an enlarged sectional elevational view taken substantially along the line IV—IV of FIGURE 4.

For example, the roller 20, as illustrated in FIGURE 3, is secured to a shaft 153 journalled in bearings 154 and 156, one end of the shaft being coupled through a drive transmission unit 157 to the shaft of an electric motor 158. The bearings 154 and 156 are supported by frame member 159, and the drive unit 157 and motor 158 are supported by an annular flange 165 firmly secured to frame member 160. The frame members 159 and 160 are, in turn, supported from a main frame generally indicated by reference numeral 161. Similarly, the roller 119, as illustrated in FIGURE 6, is secured to a shaft 162 journalled in bearings 163 and 164, one end of the shaft being coupled through a drive transmission unit 166 to the shaft of an electric motor 167. The bearings 163 and 164 are supported by frame member 168 and the transmission unit 166 and motor 167 are supported by the main frame 161. The frame member 168 is, in turn, supported by a main frame generally indicated by reference numeral 169 (FIGURE 2). It will be apparent, of course, that the main frame 169 is constructed in a recess of the floor 170 to provide an optimum overall general arrangement of the apparatus.

Figure 7:
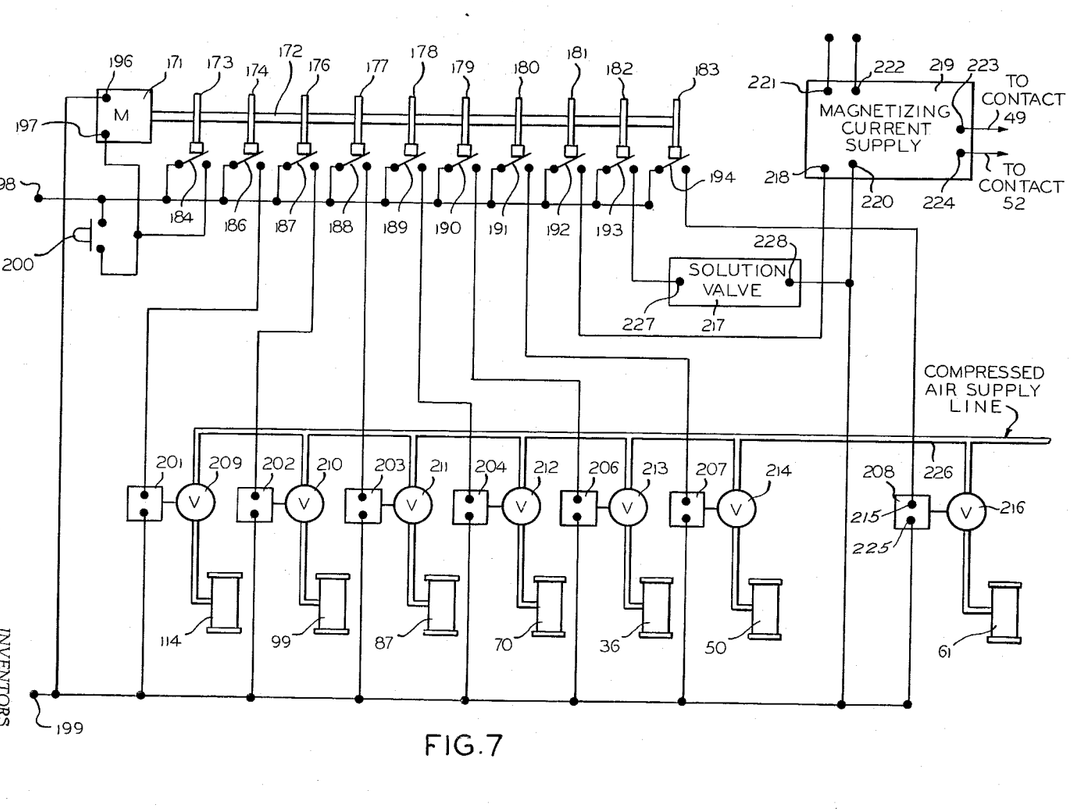
FIGURE 7 is a schematic system diagram for operation of the apparatus illustrated and described.

FIGURE 7 diagrammatically illustrates a system for the automatic control of the operation of the apparatus.

As shown, an electric motor 171 drives a shaft 172 which carries cams 173, 174, 176, 177, 178, 179, 180, 181, 182 and 183 respectively arranged to actuate switches 184, 186, 187, 188, 189, 190, 191, 192, 193 and 194.

The motor 171 has terminals 196 and 197. Terminals 198 and 199 are arranged to be connected to a suitable source of electric power. Motor terminal 196 is connected directly to terminal 199, while terminal 197 is connected to terminal 198 through a push button switch 200, which is connected in parallel with the switch 184. When the push button switch 200 is depressed, the motor 171 is energized and the cam 173 then closes the switch 184 to maintain energization of the motor 171 until the shaft 172 is rotated through 360°, whereupon switch 184 is opened to denergize the motor 171 until the push button switch 200 is again depressed.

One terminal of each of the switches 184, 186, 187, 188, 189, 190, 191, 192, 193 and 194 is connected to the input terminal 198. The other terminals of switches 186, 187, 188, 189, 190 and 191 connected respectively to electro-mechanical actuators 201, 202, 203, 204, 206 and 207, the other terminals of which are connected to the input terminal 199. Actuators 201, 202, 203, 204, 206 and 207 are arranged to control valves 209–214, which are connected between a pressurized fluid supply line 226 and cylinders 114, 99, 87, 70, 36 and 50 respectively.

Switch 192 is connected between input terminal 198 and a control terminal 218 of a magnetizing current supply 219 having a second control terminal 220 connected to the terminal 199. The magnetizing current supply 219 has a pair of input terminals 221 and 222 for connection to a suitable source of current and a pair of output terminals 223 and 224, connected respectively to contacts 49 and 52.

A supply valve 217 (shown in FIGURE 7 only) may conveniently be installed for supplying the magnetic particle bath or solution to the pipe 62. One terminal of the switch 193 is connected to the terminal 198 and a second terminal is connected to a terminal 227 of the solution valve 217 which has a second terminal 228 connected to the terminal 199.

Switch 194 is connected between the terminal 198 and a terminal 215 of the electro-mechanical actuator 208, which has a second terminal 225 connected to terminal 199. The actuator 208 is arranged to control valve 216 which is connected between a pressurized fluid supply line 226 and the air cylinder 61.

The loading rollers 14–20, unloading rollers 118–124 and chain sling turners 126–130 are all driven by electric motors as previously mentioned. In the embodiment of the invention illustrated, three separate push button stations can be located near the inspector's platform 104 to energize these motors independently of the billet loading and unloading sequence. For example, the inspector may wish to rotate and then stop the billet in the inspection station several different times, depending on the particular billet being inspected.

Cylinders 114, 99, 87, 70, 36, 50 and 61 as well as the control valves 209, 210, 211, 212, 213, 214, and 216 are dual acting. That is, when the electro-mechanical actuators are energized, their respective control valves are adapted to feed one side of the piston of the cylinder to which it is connected with pressurized fluid, thus urging the piston and its corresponding actuating arm in one direction. When the electro-mechanical actuators are deenergized, their respective control valves are adapted to feed the second side of the piston with pressurized fluid, thus urging the piston and its actuating arm in an opposite direction.

*Operation*

To describe the operation of the apparatus, it may be assumed that the motors operating the loading rollers 14–20 have been energized by a push button station (not shown) located at the inspector's platform, and that a first billet B has been moved longitudinally by rollers 14–20 to engage the snubber element 21; that a second billet $B_1$ is disposed in the notches 43–48; that a third billet $B_2$ is engaged by swingable feed arms 80–84 on the downwardly inclined portion of skid rails 71–76; and that a fourth billet $B_4$ is being carried in the inspection station 12.

With billets in such positions, billet $B_4$ can be selectively rotated at the inspection station, and marked and coded by a skilled inspector standing on the inspector's platform 104.

After such inspection the push button switch 200 is depressed to energize motor 171 and rotate the shaft 172, switch 184 then being closed to maintain energization of the motor 171 until the shaft 172 is rotated through one revolution. Switch 186 is thereafter closed to energize the actuator 201 which will correspondingly change the setting of the valve 209. Pressurized fluid is then supplied to one side of the piston in cylinder 114, which actuates the swingable receiving arm 109 and causes it to rotate clockwise approximately 45°.

The next event in the cycle of operation is the closing of switch 187 to energize the actuator 202 which, through the control valve 210, will cause pressurized fluid to be supplied to one side of the piston in the cylinder 99. Pressurization of cylinder 99 will cause counterclockwise rotation of the rapid discharge arms shown at 102 in FIGURE 2 to a position shown at 104 in FIGURE 3. As these arms rotate they engage the billet $B_4$, which is being carried in chain sling turner stations 126–130 of the inspection station 12, and raise it to a position shown at $B_5$ in FIGURE 3. Gravity will then cause the billet $B_5$ to slide downwardly along the inclined surfaces of the discharge arms as shown at 104 in FIGURE 3, and the billet will come to rest in the V-notch formed by the skid rails as shown at 106 and the receiving arms as shown at 109 in the position shown at $B_6$ in FIGURE 3. The cam 174 is arranged so that after a predetermined interval of time it will disconnect switch 186 which will deenergize the actuator 201 and cause the setting of the control valve 209 to change. This change in setting of valve 209 will cause pressurized fluid to be admitted to cylinder 114 whereby its piston and actuating arm will be urged in a direction opposite its first movement. Swingable receiving arm 109 will therefore be caused to rotate in a counterclockwise direction, to its original position as shown in FIGURE 2, and as the receiving arms as shown at 109 rotate to a position below the upper surfaces of the roller 118 the billet $B_6$ will come to rest at a position shown at $B_7$ in FIGURE 3. The actuating motors of the rollers 118–124 can thereafter be energized by means of a separate push button (not shown) to convey the billet longitudinally from the apparatus.

The next event in the cycle of operation is the closing of switch 188 which will energize actuator 203 and, through the valve 211, cause cylinder 87 to rotate the swingable feed arms 80–84 approximately 45° in a clockwise direction. This rotation of arms 80–84 wil cause the billet $B_2$, which is resting in the notch formed by the offsets of the arms 80–84 as shown at 79 and the downwardly inclined portion of skid rails as shown at 78, to slide downwardly along the inclined surfaces of arms 80–84 until it is received in abutting engagement with rapid discharge arms 91–96.

The cam 176 is arraged so that switch 187 will open after a predetermined interval of time thereby deenergizing valve 202 and, through the valve 210 and the cylinder 99, causing discharge arms 91, 92, 93, 94 and 96 to rotate clockwise from their positions shown at 91 to position 102 as illustrated in FIGURE 2. It will become apparent that as the swingable arms rotate in a clockwise direction billet $B_3$ will slide downwardly along the inclined surfaces of arms 80–84 and thereafter be brought to rest on the chain slings 103 of the chain sling turner stations 126–130, gently and without great force or impact being applied to the chain slings.

The cam 177 is arranged so that after a predetermined period of time switch 188 will open thereby deenergizing actuator 203 which will change the setting of the valve 211 and, by means of cylinder 87, cause the feed arms 80–84 positioned as at 90 in FIGURE 2 to return to their position as at 80 in FIGURE 2.

Next, cam 178 will cause switch 189 to close which will energize actuator 204 and, by means of valve 212 and cylinder 70, will cause swingable unloading arms 63, 64, 66, 67 and 68 to rotate in a clockwise direction from a position as shown at 63 in FIGURE 2 to a position as shown at 77 in FIGURE 2. As the swingable unloading arms rotate and rise above notches 43, 44, 46, 47 and 48, they will urge the billet as shown at $B_1$ in FIGURE 2 to slide along skid rails 71–76 until it comes to rest in abutting engagement with the offset as shown at 79 of the arms 80–84. The billet has therefore effectively been moved from a position as shown at $B_1$ to $B_2$ as shown in FIGURE 2.

Cam 178 is arranged so that after a predetermined interval of time switch 189 will open, valve 204 will become deenergized and change the setting of the valve 212 which will cause the clinder 70 to move arms 63, 64, 66, 67 and 68 back to their original position as shown at 63 in FIGURE 2.

Next, cam 179 will cause switch 190 to close thereby energizing actuator 206 which will, through valve 213 and cylinder 36, cause swingable loading arms 23, 24, 26, 27 and 28 to rotate in a clockwise direction from position 23 to position 25 as shown in FIGURE 2. As the swingable loading arms rotate and rise above the upper surfaces of rollers 14–20 they engage billet B and slide it along skid rails 38–42 where it thereafter comes to rest in notches 43, 44, 46, 47 and 48.

Cam 179 is arranged so that after a predetermined interval of time switch 190 will open thereby deenergizing actuator 206 and, through valve 213 and cylinder 36, will cause arms 23, 24, 26, 27 and 28 to rotate in a counterclockwise direction back to their original position as shown at 23 in FIGURE 2.

Next, cam 180 closes switch 191 which energizes actuator 207 and, through the valve 214 and cylinder 50, urges the contact 49 into abutting engagement with a billet as shown at $B_1$ in FIGURE 2, thereby urging this billet into abutting engagement with the second electric contact element 52. Next, cam 181 closes switch 192 which energizes the magnetizing current supply at 219, thereby completing an electrical circuit between contacts 49 and 52 and the billet $B_1$. The current thus supplied magnetizes the billet, and next the cam 182 closes the switch 193 which will open the magnetic particle solution valve 217, thereby feeding the particle solution through the conduit 62 to the applicator 54. Next, cam 183 closes switch 194 which energizes actuator 208 and, through valve 216 and cylinder 61, causes the applicator 54 to rotate approximately 30° in a clockwise direction. As the applicator 54 rotates, the magnetic particle solution contained therein will be discharged through the apertured lower extremity 56 to completely flood the billet $B_1$.

Cam 183 is arranged so that after a predetermined period of time it will open switch 194 thereby deenergizing actuator 208 which will change the setting of the valve 216 so that cylinder 61 will cause the applicator 54 to return to its position as shown in FIGURE 2. Cam 182 is arranged so that after applicator 54 has returned to its original position switch 193 will open, thereby deenergizing and closing solution valve 217. Cam 181 is arranged so that after the solution valve 217 has been closed, switch 192 will open which will deenergize magnetizing current supply 219 and interrupt the circuit which includes contacts 49 and 52 and the billet $B_1$. Next, cam 180 is arranged so that after the above circuit has been broken, switch 191 will open thereby deenergizing actuator 207 and changing the setting of the valve 214. The actuating arm of cylinder 50 will thereby move the contact element 49 away from the end of the billet $B_1$, to a position as shown at 49 in FIGURE 1.

After the billet B has been moved to a position as shown at $B_1$ in FIGURE 2 it is apparent that another uninspected billet could be fed onto rollers 14–20 and by energizing the electric motors which actuate these rollers by means of a push button station (not shown) located at the inspector's platform 104 the billet could be conveyed into abutting relation with the snubber element 21, and after the inspection of the billet shown at $B_4$ positioned at the inspection station, the entire loading operation could then be repeated.

Although an entire operative apparatus is herein disclosed, our invention particularly relates to the lateral loading and unloading of a billet in the inspection station from one side of the inspection station, thereby producing the advantageous results hereinbefore specified.

It should be noted that the control system illustrated diagrammatically in FIGURE 7 is a program type of system in which the cams operate in timed relation and in which each operation is controlled independently of other operations. This has the advantage of simplicity but has the disadvantage that the apparatus can become "jammed" and damaged should there be a failure in functioning of one operation. To overcome this disadvantage, a sequence type of control may be used in which each operation is initiated only upon completion of the preceding operation. For example, clockwise rotation of the swingable loading arms 23, 24, 26, 27 and 28 may be controlled by switch responsive to movement of swingable unloading arms 63–68 back to position such as illustrated at 63 in FIGURE 2.

Although minor modifications might be suggested by those versed in the art, it should be understood that we wish to embody within the scope of the patent warranted hereon all such modifications as reasonably come within the scope of our contribution to the art.

We claim as our invention:

1. In billet inspection apparatus including an inspector's platform,
   means providing an inspection station adjacent the inspector's platform including a plurality of chain sling means,
   means for delivering a billet toward said inspection station from a side thereof opposite the inspector's platform,
   means for receiving the delivered billet from the billet delivering means and gradually lowering the billet to said chain sling means,
   means for transferring an inspected billet upwardly and laterally from said chain sling means,
   conveying means situated adjacent said inspection station on the side thereof opposite the inspector's platform for conveying an inspected billet longitudinally away from the inspection apparatus, and
   means for receiving an inspected billet from said transferring means and for gradually lowering the billet to said conveying means.

2. In billet inspection apparatus, means providing an inspection station including a billet supporting and turning structure,
   means providing a first incline for delivering a billet by gravity downwardly laterally to said inspection station,
   means for raising the inspected billet from said supporting and turning structure to a raised position,
   means providing a second incline for transferring the inspected billet by gravity downwardly laterally from said raised position,
      said second inclined transferring means sloping in a direction opposite said first inclined transferring means, and
   receiving and conveying means for receiving the inspected billet from said second inclined transferring means and thereafter conveying the billet longitudinally from the apparatus,
      said receiving and conveying means including a plurality of V-notched run-out rollers on stationary spaced parallel horizontally aligned axes.

3. In apparatus for magnetizing and inspecting billets for flaws and imperfections as revealed by the orientation of magnetic particles on the surface of the billets,
   means providing a magnetizing station including means for engaging and magnetizing a billet and for applying magnetic particles thereto,
   a first set of swingable arm means for loading a billet sidewardly into said magnetizing station, a second set of swingable arm means for ejecting and transferring a magnetized billet from said magnetizing station,
   means providing an inspection station adjacent said magnetizing station including a billet supporting and turning structure,
   a third set of swingable arm means for receiving a billet from said ejecting and transferring means, a fourth set of swingable arm means for receiving a billet from said third set of swingable arm means and thence gradually lowering the billet to said billet supporting and turning structure and thence for elevating and sidewardly transferring the billet from the supporting and turning structure in the direction of said magnetizing station,
   roller conveyor means for horizontally and longitudinally conveying a billet away from the apparatus,
   a fifth set of swingable arm means for receiving a billet from said fourth set of swingable arm means and gradually lowering the billet to said roller conveyor means, and
   means for actuating said swingable arm means in a correlated predetermined sequence.

4. In billet inspection apparatus,
   means providing an inspection station,
   swingable arm means operable between first and second and third positions for transferring a billet from said inspection station in said first position thereof and then receiving a billet in said second position thereof and then lowering and depositing a billet in said inspection station in said third position thereof,
   means for delivering a billet sidewardly to said swingable arm means in said second position thereof,
   means for receiving a billet from said swingable arm means in said first position thereof,
   means for causing movement of said swingable arm means to said first position thereof following inspection of a billet in said billet inspection station, means for causing movement of said swingable arm means to said second position following movement thereof to said first position, means for causing operation of said delivering means following movement of said swingable arm means to said second position thereof, and means for causing movement of said swingable arm means to said third position thereof following operation of said delivering means.

5. In billet inspection apparatus, means providing a magnetizing station including means for engaging and magnetizing a billet and means for applying magnetic particles thereto, means for transferring sidewardly a treated billet from said magnetizing station, means providing an inspection station including billet turning means comprising a plurality of spaced chain sling means for receiving sidewardly a treated billet from said transferring means, means for removing an inspected billet sidewardly from said chain sling means in the direction of said magnetizing station, means situated laterally between said chain sling means and said magnetizing station for receiving a billet from said removing means, means for causing operation of said transferring means following operation of said removing means, and means for causing operation of said removing means following inspection of a billet in said inspection station.

6. In billet inspection apparatus, means providing a magnetizing station, means providing an inspection station including a plurality of chain sling means for supporting a billet at longitudinally spaced points thereof, each of said chain sling means including a pair of sprockets on stationary spaced parallel axes and a chain trained thereover and affording a catenary therebetween and means for rotating said sprockets to rotate the billet, means for delivering a billet laterally downwardly from said magnetizing station to said chain sling means, means situated below said chain sling means for receiving an inspected billet therefrom, swingable arm means for receiving the billet from said delivering means and lowering the billet gradually to said chain sling means and for thereafter elevating the billet from said chain sling means for lateral discharge therefrom and for delivering the billet laterally downwardly to said receiving means.

References Cited by the Examiner

UNITED STATES PATENTS

| | | |
|---|---|---|
| 1,108,048 | 8/14 | Willette. |
| 2,754,964 | 7/56 | Muller ____________ 198—33.4 X |
| 2,777,587 | 1/57 | Hunter. |
| 2,860,764 | 11/58 | Barton. |
| 2,960,240 | 11/60 | Evans. |
| 2,990,512 | 6/61 | Gewartowski. |

FOREIGN PATENTS 1,003,081   2/57   Germany.

HUGO O. SCHULZ, *Primary Examiner.*